(12) United States Patent
Hurst et al.

(10) Patent No.: US 9,680,889 B2
(45) Date of Patent: Jun. 13, 2017

(54) SYSTEM AND METHOD OF MANAGING MULTIPLE VIDEO PLAYERS

(75) Inventors: Mark B. Hurst, Cedar Hills, UT (US); David S. Anderson, Salt Lake City, UT (US); Krysta L. Hurst, Provo, UT (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 13/481,528

(22) Filed: May 25, 2012

(65) Prior Publication Data

US 2012/0302343 A1    Nov. 29, 2012

Related U.S. Application Data

(63) Continuation of application No. 12/014,677, filed on Jan. 15, 2008, now Pat. No. 8,190,760.

(51) Int. Cl.
| | |
|---|---|
| G06F 15/16 | (2006.01) |
| H04L 29/06 | (2006.01) |
| H04N 21/432 | (2011.01) |
| H04N 21/442 | (2011.01) |
| H04N 21/443 | (2011.01) |
| H04N 21/647 | (2011.01) |
| H04N 21/81 | (2011.01) |

(52) U.S. Cl.
CPC .......... *H04L 65/4069* (2013.01); *H04L 65/80* (2013.01); *H04N 21/4325* (2013.01); *H04N 21/443* (2013.01); *H04N 21/44209* (2013.01); *H04N 21/64753* (2013.01); *H04N 21/64769* (2013.01); *H04N 21/8166* (2013.01)

(58) Field of Classification Search
CPC .................................................. H04N 21/44209
USPC ........................ 463/40–42; 375/219; 709/231
See application file for complete search history.

(56) References Cited

U.S. PATENT DOCUMENTS

| | | |
|---|---|---|
| 4,535,355 A | 8/1985 | Arn et al. |
| 5,377,051 A | 12/1994 | Lane et al. |

(Continued)

OTHER PUBLICATIONS

Noble et a., "Experience with adaptive mobile applications in Odyssey", published circa 1999.*

(Continued)

*Primary Examiner* — David L Lewis
*Assistant Examiner* — Ross Williams
(74) *Attorney, Agent, or Firm* — LK Global

(57) ABSTRACT

A system and method are provided for managing multiple video players executing on a client software platform. Each video player can have at least one video data stream supplied over a data network. A priority value can be applied to selected video players, and an amount of available bandwidth can be determined. The determined amount of available bandwidth may also be used to calculate whether the selected video players can sustain a video playback quality above a pre-defined threshold. This operation can include appropriately apportioning and managing bandwidth and/or processing power allotments between the video players based on the priority assignments when the bandwidth and/or processing power is less than what the video players want to consume. A modify playback message may be sent to at least one video player when the video playback rate is not sustainable or has become sustainable again.

20 Claims, 4 Drawing Sheets

(56) References Cited

U.S. PATENT DOCUMENTS

| | | | |
|---|---|---|---|
| 5,761,417 | A | 6/1998 | Henley et al. |
| 5,953,506 | A | 9/1999 | Kalra et al. |
| 6,005,599 | A | 12/1999 | Asai et al. |
| 6,016,166 | A | 1/2000 | Huang et al. |
| 6,104,705 | A * | 8/2000 | Ismail et al. ............. 370/260 |
| 6,195,680 | B1 | 2/2001 | Goldszmidt et al. |
| 6,366,614 | B1 | 4/2002 | Pian et al. |
| 6,490,627 | B1 | 12/2002 | Kalra et al. |
| 6,563,793 | B1 | 5/2003 | Golden et al. |
| 6,574,591 | B1 | 6/2003 | Kleiman et al. |
| 6,604,118 | B2 | 8/2003 | Kleiman et al. |
| 6,745,246 | B1 | 6/2004 | Erimli et al. |
| 6,771,661 | B1 | 8/2004 | Chawla et al. |
| 6,909,836 | B2 | 6/2005 | Belley et al. |
| 6,976,090 | B2 | 12/2005 | Ben-Shaul et al. |
| 6,978,306 | B2 | 12/2005 | Miller et al. |
| 7,240,100 | B1 | 7/2007 | Wein et al. |
| 7,240,111 | B2 | 7/2007 | Van Harlingen et al. |
| 7,480,239 | B1 | 1/2009 | Sundaresan et al. |
| 7,523,181 | B2 | 4/2009 | Swildens et al. |
| 7,711,791 | B2 | 5/2010 | DuVall et al. |
| 8,190,760 | B2 | 5/2012 | Hurst et al. |
| 8,239,564 | B2 | 8/2012 | Freelander et al. |
| 2001/0007574 | A1 | 7/2001 | Liu et al. |
| 2002/0133247 | A1 | 9/2002 | Smith et al. |
| 2002/0152318 | A1 | 10/2002 | Menon et al. |
| 2003/0014684 | A1 | 1/2003 | Kashyap et al. |
| 2003/0115598 | A1 | 6/2003 | Pantoja et al. |
| 2003/0151753 | A1 | 8/2003 | Li et al. |
| 2003/0154239 | A1 | 8/2003 | Davis et al. |
| 2003/0172131 | A1 | 9/2003 | Ao et al. |
| 2003/0182425 | A1 | 9/2003 | Kurakake et al. |
| 2004/0083283 | A1 | 4/2004 | Sundaram et al. |
| 2004/0103444 | A1 | 5/2004 | Weinberg et al. |
| 2004/0193726 | A1 | 9/2004 | Gatto et al. |
| 2005/0108414 | A1 | 5/2005 | Taylor et al. |
| 2005/0120107 | A1 | 6/2005 | Kagan et al. |
| 2005/0123058 | A1 | 6/2005 | Greenbaum et al. |
| 2005/0188051 | A1 | 8/2005 | Sneh et al. |
| 2005/0262257 | A1 | 11/2005 | Major et al. |
| 2006/0031438 | A1 | 2/2006 | Tokuhashi et al. |
| 2006/0080718 | A1 | 4/2006 | Gray et al. |
| 2006/0206246 | A1 | 9/2006 | Walker et al. |
| 2006/0245355 | A1 | 11/2006 | Iwamura |
| 2007/0024705 | A1 | 2/2007 | Richter et al. |
| 2007/0024706 | A1 | 2/2007 | Brannon, Jr. et al. |
| 2007/0177604 | A1 | 8/2007 | Ozawa et al. |
| 2008/0072264 | A1 | 3/2008 | Crayford et al. |
| 2008/0219151 | A1 | 9/2008 | Ma et al. |
| 2008/0232763 | A1 | 9/2008 | Brady et al. |
| 2008/0242280 | A1 | 10/2008 | Shapiro et al. |
| 2008/0288983 | A1 | 11/2008 | Johnson et al. |
| 2008/0301732 | A1 | 12/2008 | Archer et al. |
| 2009/0013086 | A1 | 1/2009 | Greenbaum et al. |
| 2009/0085740 | A1* | 4/2009 | Klein ............... G08B 13/19695 340/540 |
| 2009/0132942 | A1 | 5/2009 | Santoro et al. |
| 2009/0187955 | A1 | 7/2009 | Sullivan et al. |
| 2009/0196302 | A1 | 8/2009 | Pastorino et al. |
| 2009/0228919 | A1 | 9/2009 | Zott et al. |
| 2009/0254657 | A1 | 10/2009 | Melnyk et al. |
| 2011/0022705 | A1 | 1/2011 | Yellamraju et al. |
| 2012/0005368 | A1* | 1/2012 | Knittle .................... 709/235 |

OTHER PUBLICATIONS

International Search Report and Written Opinion for Application No. PCT/US2009/30877 dated, Feb. 27, 2009.

International Preliminary Report on Patentability for Application No. PCT/US2009/30877, dated Jul. 20, 2010.

USPTO "International Search Report" mailed Dec. 12, 2008; International Appln. No. PCT/US2008/061035, filed Apr. 21, 2008.

Walpole, Jonathan et al. "A Player for Adaptive MPEG Video Streaming Over the Internet" Department of Computer Science and Engineering, Oregon Graduate Institute of Science and Technology; 1997.

USPTO, Final Office Action for U.S. Appl. No. 13/843,379 mailed Aug. 21, 2015.

U.S. Patent and Trademark office, Non-Final Office Action, dated Dec. 19, 2014 for U.S. Appl. No. 13/843,379.

USPTO, Office Action in U.S. Appl. No. 13/843,379 mailed Sep. 9, 2016.

* cited by examiner

SYSTEM AND METHOD OF MANAGING MULTIPLE VIDEO PLAYERS

BACKGROUND

The Internet is becoming a preferred method for distributing media files to end users. It is currently possible to download music or video to computers, cell phones, and practically any network capable device. Many portable media players and computers are equipped to connect to a network and play music, videos, and other multimedia files. The music, video files, and other multimedia files (hereinafter "media files") can be stored locally on a media player, streamed, or downloaded from a server.

Streaming of data files or "streaming media" refers to technology that delivers content at a rate sufficient to present the media to a user at the originally anticipated playback speed without significant interruption. Streamed data may be stored in memory temporarily until the data is played back and then subsequently deleted. In most streaming systems, the user has the immediate satisfaction of viewing the requested content without waiting for the entire media file to completely download. However, the audio/video quality that can be received for streaming presentation is constrained by the available bandwidth of the network connection. Streaming may be used to deliver content on demand from previously recorded broadcasts or content from live broadcasts.

Streaming offers the advantage of immediate access to the content but tends to sacrifice quality in order to maintain the playback speed within the constraints of the available bandwidth. The opportunity for a user to select different content for viewing on an ad hoc basis is provided by streaming, but streaming is not currently able to fully support rewind, fast forward, and direct seek operations functions. Streaming is also vulnerable to network failures or congestion.

Generally, three basic challenges exist with regard to data streaming over a network (e.g., the Internet) that has a varying amount of data loss.

The first challenge is reliability. Most streaming solutions use a TCP connection or "virtual circuit" for transmitting data. A TCP connection provides a guaranteed delivery mechanism so that data sent from one endpoint will be delivered to the destination, even if portions are lost and retransmitted. When a network adapter detects delays or losses in a TCP connection, the adapter "backs off" from transmission attempts for a moment and then gradually resumes the original transmission pace. This behavior is an attempt to alleviate the perceived congestion. One measure of reliability is "packet loss" measured as a percentage of all the packets transmitted from one host to another that were not received.

The second challenge to data transport is efficiency. Efficiency refers to how well the user's available bandwidth is used for delivery of the content stream. When a TCP connection is suffering reliability problems, then a loss of bandwidth utilization can result.

The third challenge is latency. Latency is a measure of the time interval between when a client's request is issued and the response data begins to arrive at the client. This metric is affected by the network connection's data transmission rate, reliability, efficiency and the processing time required by the origin to prepare the response.

The challenges described above are multiplied when multiple software video players are used in one web page or a single client application. For example, multiple instances of a video player can be used within a web browser to form a simulated video wall on a single video display screen. However, the underlying video control applications then have the difficult job of appropriately allocating and managing the varying available bandwidth between the multiple video players.

SUMMARY

A system and method are provided for managing multiple video players executing on a client software platform in a networked environment. The method includes the operation of displaying a plurality of video players viewable by an end user. Each video player can have at least one video data stream supplied over a data network. A priority value can be applied to video players selected from the plurality of video players. In addition, an amount of bandwidth available from the data network to supply the plurality of video players can then be determined. Another operation is calculating whether the selected video players can sustain a video playback quality above a pre-defined threshold using the determined amount of bandwidth available. This operation can include appropriately allocating and managing the varying available bandwidth between the multiple video players based on the priority assignments of the video players. A modify playback message may be sent to at least one video player when the video playback rate is not sustainable.

Additional features and advantages of the invention will be apparent from the detailed description which follows, taken in conjunction with the accompanying drawings, which together illustrate, by way of example, features of the invention.

DETAILED DESCRIPTION

Figure 1:
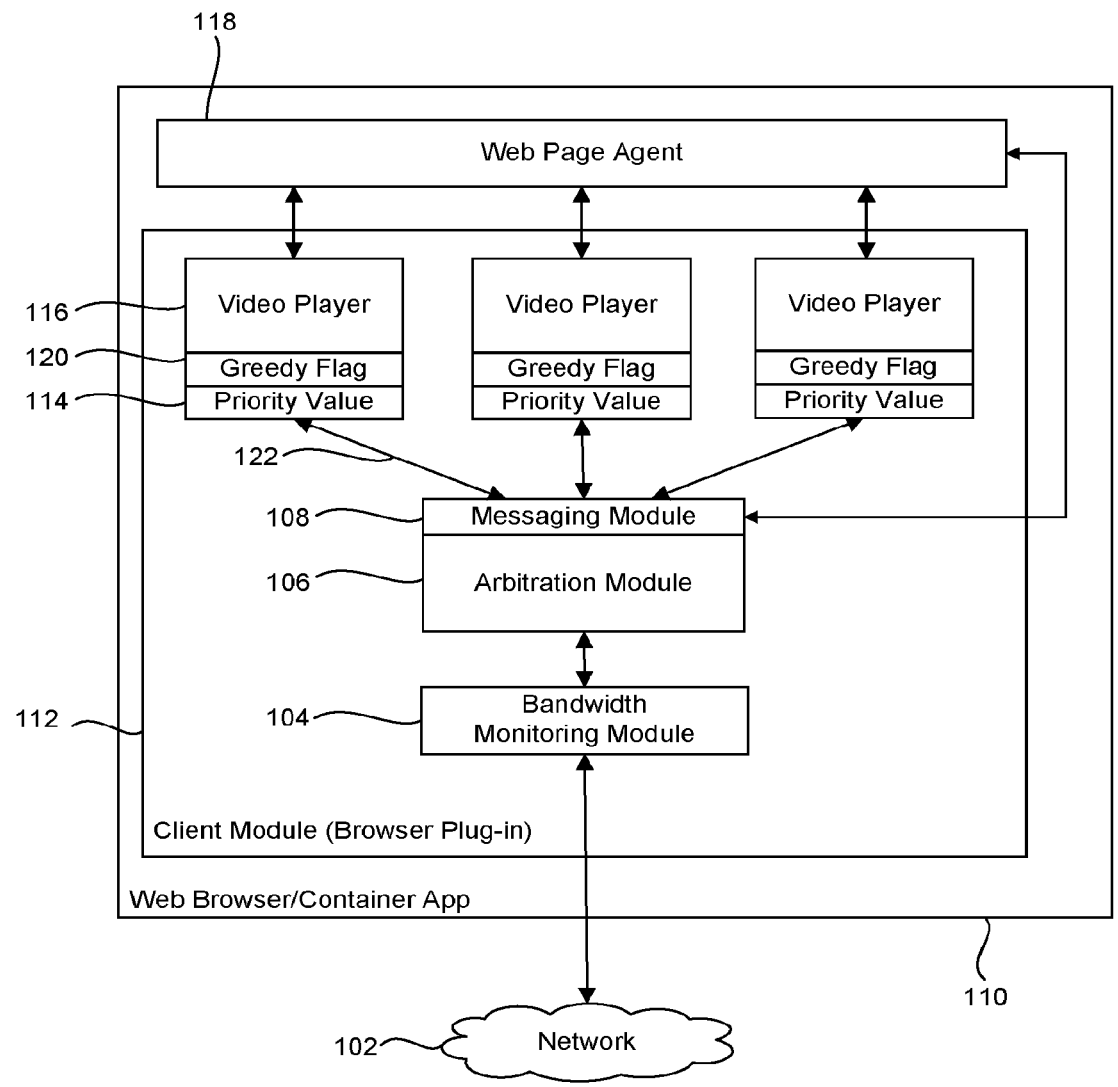
FIG. 1 is a block diagram illustrating an embodiment of a system for managing multiple video display players.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

A system and method can be provided for managing multiple video players, as illustrated in FIG. 1. The system can be configured to allocate shared network bandwidth between the video players and to manage which video players can consume most of the overall bandwidth from a network connection. A plurality of video players 116 or video clients can be configured to be viewable by an end user using a video display of a client computer. The video players may be implemented as software objects (e.g., plug-ins) in a web page and web browser 110. These video players can include a video output frame where video is rendered for viewing by an end user. Each video player can be configured to have at least one video data stream 122 supplied over a data network. The data stream may use one or more TCP connections that are received over the Internet or another type of transport protocol may be used.

A priority value 114 can be applied to each of the video players. The priority value may be applied only to selected video players or priority values can be applied to any group of video players. The priority values may be ordinal values and an end user or software developer can set the priority of the video players according to the importance of the video stream being played. The priority value can be set in the web page code and then communicated by the web page agent 118 to the video players 116 and the arbitration module 106 via the messaging module 108. For example, the web page designer can assign priority to a video player or video object by using a function call such as, "player.Set("PlayerPriority", "1");". Calling the same function with a parameter of "0" can remove the prioritization.

Any player can be prioritized or un-prioritized, but a non-priority setting is the default for the video players in one embodiment. The priority values are relative, where the value 1 can be the highest priority, 2 can be the next-highest priority, and so on. The priority values do not need to start at 1, be contiguous, or the priority values may even be in a reverse ordering. However, the relative order is significant. For example, the main video player may be designated as priority value 1 with several smaller frame size video players being assigned priorities 2 through 5. In another example, the priority values may be in tiers. There may be two or three top priority players with equal priorities in a first tier, a few more video players in a second priority tier, and other players on a third tier.

As discussed, a single video player or video client may be designated as the main video player and can be configured with the highest priority. The main video player is also likely to have the largest image size or frame and an important video feed. Thus, the main video player can receive the highest priority designation. The other video players can receive increasing values to represent decreasing priority (e.g., 2nd-7th).

Each video player may have a video player profile that defines a plurality of data rate levels for which pre-processed video data blocks or streamlets can be requested and concatenated to provide smooth video transfer at the player's allocated bandwidth. Streamlets are video data blocks containing video data that are compressed and optimized for a specific data transfer bandwidth. In other words, a streaming video server, web server, web cache, or even a different client module will have video blocks or streamlets that match the data rate levels in the video player profiles. The specific content being played by each player has an associated set of 1 to N possible stream data rates or profile levels based on different encoding profiles. Individual entries in the video player's profiles are assigned a profile identifier in order of ascending bit rate. Thus, a video player can request the streamlets at a specific quality level that matches the bandwidth allocated to the video player and this allows the video player to play as smoothly as possible. When a change in the available bandwidth is observed, then a different quality level of streamlets may be requested by the video player.

A bandwidth monitoring module 104 is configured to determine an amount of bandwidth available from the data network 102. This bandwidth is used to supply data streams to the plurality of video players. When the total amount of bandwidth is known, then the bandwidth amounts that can be allocated to separate video players can be calculated as described below.

An arbitration module 106 can be provided that is configured to dynamically allocate the bandwidth that supplies all of the active video players. When multiple video players are used on a single web page, the arbitration module is configured to calculate whether the active video players can sustain a desired video playback quality above a pre-defined threshold with the available network bandwidth. The arbitration module can receive the total amount of bandwidth from the bandwidth monitoring module 104. The bandwidth available may be an amount such as 3 Megabits. Then the arbitration module can compare the total bandwidth with the number of video players requesting bandwidth, the amount of bandwidth each video player is requesting, and each video player's priority value to determine the amount of bandwidth each video player can be allotted. This determination can initially allot the bandwidth pro rata between the video players depending on the highest requested data rate in each video player's bandwidth profile.

Arbitration may occur using the arbitration module when not enough bandwidth is available, as described in the following examples. At any given time, the arbitration module player can use several factors to determine a most desired bit rate for each player, such as priority, profile data rates, ability to play back the video according to available processing power, and available bandwidth.

In one embodiment, a video player is stopped from playing back the streaming video when the desired video playback quality for the video player is not sustainable, i.e. the lowest quality profile of video data cannot be obtained in real time. The video player that is selected to be stopped can have a priority lower than the main playback window. For example, the video player that can be selected to be stopped is the video player with the lowest priority.

In another embodiment, the lowest priority player can give up its most desired profile selection in an effort to make the aggregate desired bandwidth of all prioritized players be less than or equal to the overall available bandwidth. If that reduction is still insufficient, the next highest priority player can sacrifice by downgrading its bandwidth selection to a lower profile entry. This process continues up the priority chain as needed through the higher priority players until the target bandwidth is reached. If the top priority player is reached and it cannot play at a defined quality as desired, then it too will begin to back down to lower profiles. This cycle can be repeated as many times as is necessary. Players with identical priorities can sacrifice their profiles in tandem and this will be discussed in more detail later. Eventually, some players (beginning with lowest priority players) may need to be eliminated from active use. Since it is unlikely that all the players will be able to obtain the maximum desired playback quality, this method enables an efficient allocation based on priority and each player's bandwidth profile. A combination strategy of reducing video player bandwidth profiles and stopping video players can also be used.

As an example of a combined strategy, in another embodiment, the lowest priority player can give up its most desired profile selection. If that is still insufficient, the same video player can give up its next lower profile entry. This process continues until the video player has no more profiles left and the arbitration module tells the video player it should stop. If the elimination of the video player's participation has not brought the players' aggregate desired bandwidth usage down to the target bandwidth, this process of reduction and elimination continues up the priority chain, each player in turn sacrificing and possibly becoming expendable, until the aggregate desired bandwidth of all prioritized players has been reduced down to be less than or equal to the overall available bandwidth. A greedy flag may be associated with each player that will modify the preceding two examples to prevent elimination of a player that has sacrificed all but its lowest profile. The greedy flag will be discussed in detail later.

In order for the arbitration functionality to be executed as described above, messaging between the video players and other system components can take place in the system and this messaging will now be described in more detail. The messaging module 108 can be in communication with the arbitration module 106. In another embodiment, the messaging module may be integrated directly into the arbitration module. The messaging module can be configured to send a "modify playback message" to at least one active video player when the video playback rate is not sustainable as calculated by the arbitration module. These messages can be sent when the video playback rate is not sustainable for all the video players.

The modify playback message may request an active video player to take any one of a number of actions. In one situation, a stop playback message can be sent to an active video player which has the lowest priority value and then the video player will stop. Of course, a stop message may be sent to any of the video players which have a lower priority than the main video player because one goal is to maintain the video playback continuity of the main video player. In another situation, the lowest priority video player can be sent a message to reduce the playback from the current bandwidth profile level to the next lower bandwidth in its profile listing.

The modify playback message has been discussed as being sent to the video players, the modify playback messages may be sent directly to the web page or indirectly through a video player. For example, the web page may receive a message that the current bandwidth requested by the aggregate players is sustainable or not sustainable. Then the web page may make a separate determination regarding which players will be requested to reduce their quality level requests or to stop playback completely.

Whether the video playback rate is sustainable can be tested by creating a continuity playback threshold value for the video players. This means that the video player can measure how frequently video frames are being played. When the amount of time the video player is actually playing video frames drops below the continuity playback threshold, then the video player will know that the current bandwidth the video player is receiving is insufficient. This video threshold value can be a percentage of time such as whether the video player is playing 70% of the time. When the playback is not sustainable, then the video player may move to a blocked state and stop making streamlet allotment requests from the client module 112 and or arbitration module 106. A message can also be sent to the web page agent through the affected video player about the video player's currently blocked state. Periodic recalculations may be made to determine whether the video player is able to re-start video playback. If video playback is later possible, then the web page agent will be notified and the video player can wait for a message from the web page agent to restart. Alternatively, the video player can automatically try to re-start after a defined period of time.

While the present system has been described as having priority values attached to video players, providing a priority for each video player is not always desirable. A user or software developer may designate one or more video players, and these video players will not have an assigned priority value. This means that these non-priority players will play when there is extra bandwidth available and the priority players are playing video at their most desired profile level.

A greedy flag 120 may be associated with each video player. When the greedy flag is set, this flag defines a video player that will not reduce video playback below a minimum defined level. The minimum defined level may be a minimum profile data rate or a set bandwidth value. This enables an end user or software designer who is configuring a system to designate video players that will maintain a defined quality level even when other video players are having their bandwidth reduced or stopped by the arbitration system. For instance, the playback quality of a video player with the greedy flag may yield the data rate settings in its profile until the video player reaches its lowest setting. Then other video players will have to be degraded to a quality level below their desired playback profile. The other video players without the greedy flag may even need to be completely stopped.

An example of using the greedy flag is where an important stream may be a video stream containing paid advertising. Since advertisers expect that viewers will see the advertising at a certain quality level, this may be the stream that has a greedy flag set. Another example may be a live video stream that is a presenter in a networked video teleconference. The presenter's greedy video stream can have a higher priority over other video streams that are just showing support information or static slides for the video conference.

In addition, the main video player or highest priority video may have an implicit greediness so that other video players will be stopped and/or degraded first. This is also valuable because end users and developers usually want to have at least one video player trying to play even when the network bandwidth is severely degraded.

While the methods used by the arbitration module for scanning through the video players may vary significantly, it is helpful to describe one example of how the arbitration module may scan through the video players. For example, three scans may be made by the arbitration module in lowest to highest video player order. The first scan can ignore the player state (paused/playing) and will respect the greediness flag of the players that may be set. The second scanning pass can reallocate the bandwidth from any paused and/or stopped players that would otherwise be granted in the first scan. Finally, if the main player is not sustainable, then the second scan can be repeated but the scan can ignore the greedy flags.

One result of the described system and method is that it has a goal of always having some content playing in as many of the video windows as possible, whether the content is live or "on demand." The video players are also configured to play only when there is ample communications bandwidth and CPU processing power for the video to be rendered consistently.

If there is not enough network bandwidth available for one or more of the video players to play at minimum desired rates, then a static image thumbnail may be presented in that player's window rather than a video stream. Fortunately, a static thumbnail takes very little or no processing and network bandwidth in comparison to the resources needed for the large window. The web page may be responsible for supplying and displaying the static images.

Another valuable result of the present system is that if the arbitration module determines that playback of a video player is not practical even at the most minimally acceptable quality, the arbitration module will send a modify playback message to the video player (lowest priority players can be affected first). That player may enter a "stopped" state. The video player will then send a message to the web page informing it that the arbitration module made the determination that playback for that particular video player is not sustainable. The notification message will include the time index in the content at which playback was stopped.

The web page can then do one of the following: present the static thumbnail that the web page provides (e.g. show the current channel logo), present a static thumbnail of the last played content, display a user selected picture, or display some other image. After some time has passed, the arbitration module may determine that the bandwidth and/or CPU processing is available for the video player to now play the video. In the restart case, the arbitration module can notify the video player and the video player can notify the web page with a "now this window can play" message but take no action on its own. At that point, the web page can take the action the web page desires with that player. For example, the web page can send a message to play from the last position, seek somewhere else (like seek-to-live to bring the playback index up to date), do nothing, or take some other action.

Figure 2:
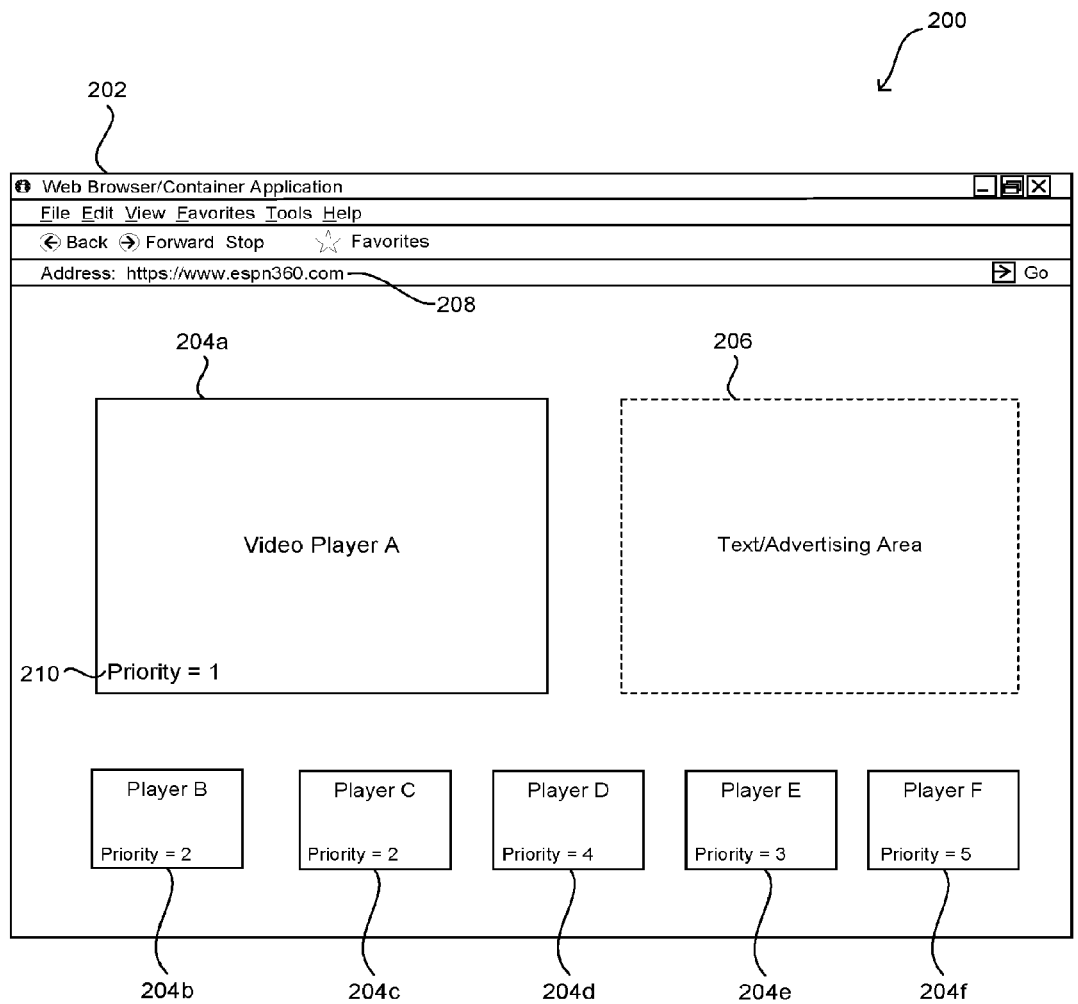
FIG. 2 illustrates a user interface for using the multiple video display players of FIG. 1 in accordance with an embodiment of the present invention.

FIG. 2 illustrates an example of a user interface for a plurality of client video players 204a-f that are embedded into a web page 202. The video players and the client that controls the video players can be loaded as plug-ins to the web browser software. The web page can also contain one or more advertising areas 206. The advertising areas can be a static image, static text, dynamic text, flash animation, Java applets, ActiveX, a video player or another other type of active advertising.

While the illustrated interface shows one main player 204a, the web page may have multiple main players with the same priority. For example, two main video players may be provided and a few small video players can be placed below the two main video players. Any number of main players can be provided and any number of lower priority players can be provided, but the number of total players may be limited by practical bandwidth concerns or by display screen real estate. In one alternative embodiment, all the video players in each grouping can have the same priority.

The video content that is supplied to the multiple video players can be received via a website 208. The video content may be streamed from streaming video servers whose addresses are received by the underlying client application from the referring website. Each video player also has an assigned priority 210 as illustrated. These assigned video priorities affect the playback of the video players as described previously.

An example use of the present system and method may be a sports network that has a web page for their sports feed offerings. The sports web page can feature a main player area that is intended to play video at the best possible quality. Additionally, the web page can feature thumbnail sized players that are intended to provide a dynamic and interactive experience for the user to view multiple video channels simultaneously. If the user selects the available programming in one of the thumbnail sized players by clicking on the small player, then the channel in the main player can be swapped with the channel in the thumbnail sized player. As a result, the video player priorities can also be switched.

Some of the mini-players may be intended to play continuously. A live feed is an example of such continuous feeds. The live feed may use the greedy attribute to maintain the continuous feed. Other mini-players may play video when enough bandwidth is available after satisfying the demands of players (of any size) that are expected to play continuously or satisfying other higher priority players.

The use of this system and method provides a video player priority feature which allows web designers to place multiple video player objects on a single web page and specify the relative priorities between players. The defined priorities are used to apportion the quality of playback when the available network bandwidth is less than what the aggregate video players would ideally like to consume.

In one embodiment, the overall power of the client computer's processing system can be taken into account. If the client computer is not able to keep up with processing the video due to limitations in the CPU, hard drive, local busses or other hardware limitations, then this bottleneck can be factored into the allocation of bandwidth to the video players. When the system determines that the client computer does not have enough processing power to process the video for all of the video players then the prioritization methods described previously can be used to decide which video player to stop. For example, if the client computer does not have enough processing power to display the video for five video players then the lowest priority video player can be stopped. The system can also use a combination of client computer power and bandwidth to make the prioritization decisions.

The redistribution of bandwidth is also effective when one of the multiple players is paused. Then the arbitration module can compute how to redistribute the network bandwidth between the revised number of video players. As a result, some or all of the video players may be able to increase the data rate selection from their profile for which the streamlets or video packets are downloaded.

The priorities of the video players are not static and can be set and reset by the web page or applications associated with the web page. Application program interfaces (APIs) for the prioritization system can be exposed or accessible to the web page or any embedded programs with the web page. This means the web page can change the priority when there is a reason to change the priority. For example, if the web page is reloaded by a user and the priority of the data streams has been changed by the content provider, then the web page can make a call to the video players and related client to update the priority of the video players.

Another example of changing a video player and video stream's priority is where a server aware process is associated with the web page. This type of process might be a Java application, ActiveX control, plug-in, active server page (ASP) application, or another script. The server aware process may receive instructions that a video stream type has changed from a pre-recorded video stream to a live stream and that the priority of the new live stream needs to be increased. When the server aware process receives this message, the process can pass the re-prioritization request to the web page. The web page can then make appropriate API call to change the priority. Alternatively, the server aware application may be able to make a direct call to the video player client or plugin.

Figure 3:
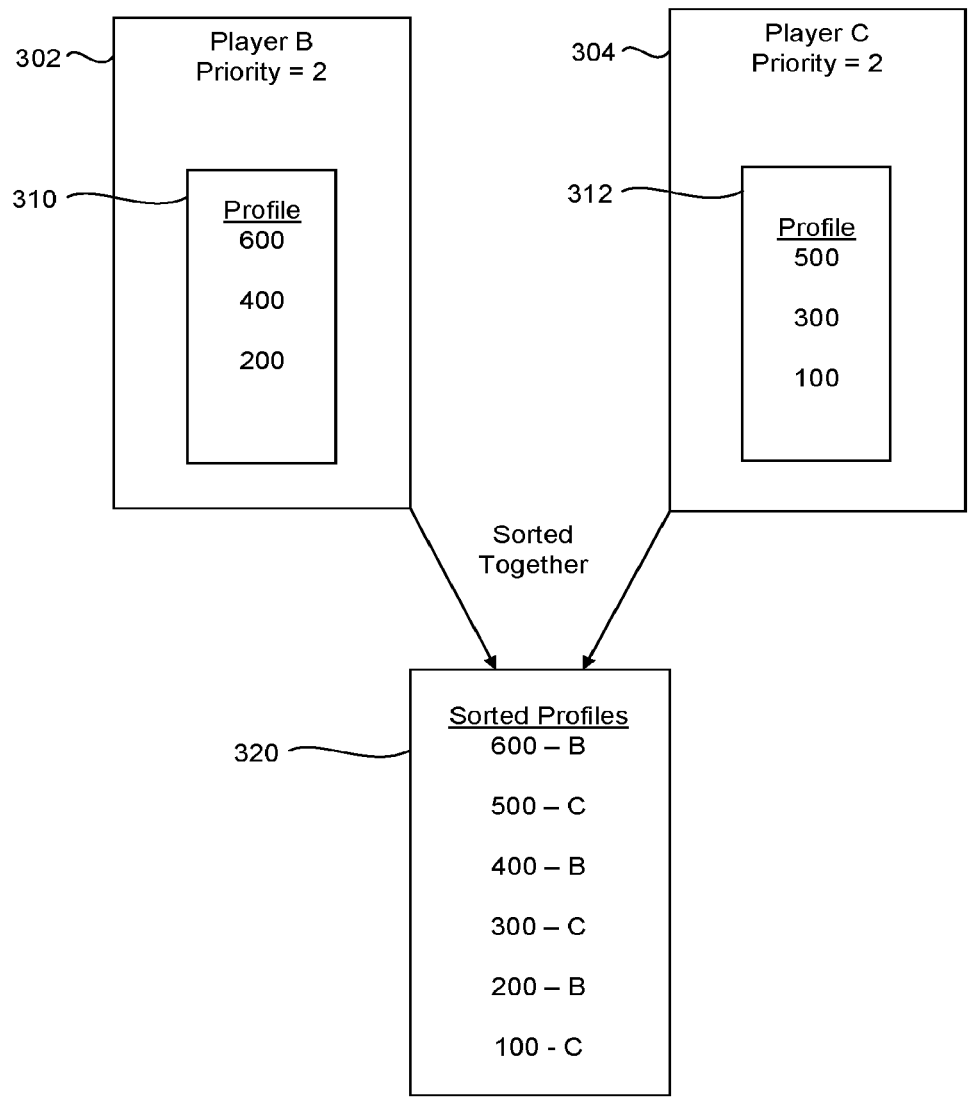
FIG. 3 illustrates an embodiment of a method of combining video player profiles to create a sorted list having a plurality of data rate levels by video player name that represent video data rates for requesting video streamlets at quality levels.

In another embodiment, a method of managing multiple video players can be used for managing video players that have equal priority values. As illustrated in FIG. 3, a video player profile 310, 312 can be defined for each video player 302, 304. The video player profiles include a plurality of data rate levels that represent video streamlet quality and/or sizes for video transfer and playback at different bit rates over a network.

Because the video players 302, 304 have equal priorities, the data rate levels from both video player profiles can be combined and sorted together to create a sorted list 320 with data rate levels that represent a data rate for requesting encoded video streamlets. Each profile entry in the sorted list is tagged with the name or ID of the video player profile from which the bandwidth entry originally came. The sorted list of data rate profile entries from the video players with the equal priority values can form a sorted list from highest data rate entries to the lowest data rate entries.

As described previously, the system can determine an amount of bandwidth available from the data network to supply the plurality of video players. Then a calculation can be performed to determine whether the plurality of active video players can sustain a video playback quality above a pre-defined threshold. If the video playback rate is not sustainable, then a reduce quality playback message may be received by the video players that have equal priority.

When a reduce playback message is sent to one of the equal priority video players, then the first entry from the sorted list is removed (regardless of which video player receives the message). The video player associated with the first entry will then be reduced to its next preferred data rate. When the next modify playback message is received, the second entry from the sorted list will be removed and the corresponding video player will decrease its data request rate. This second entry may belong to the first video player or the second video player. This process can be repeated until the list is emptied. Treating equal priority video players in the way allows the video players that have equal priority to be treated as a single video player using the sorted list.

Figure 4:
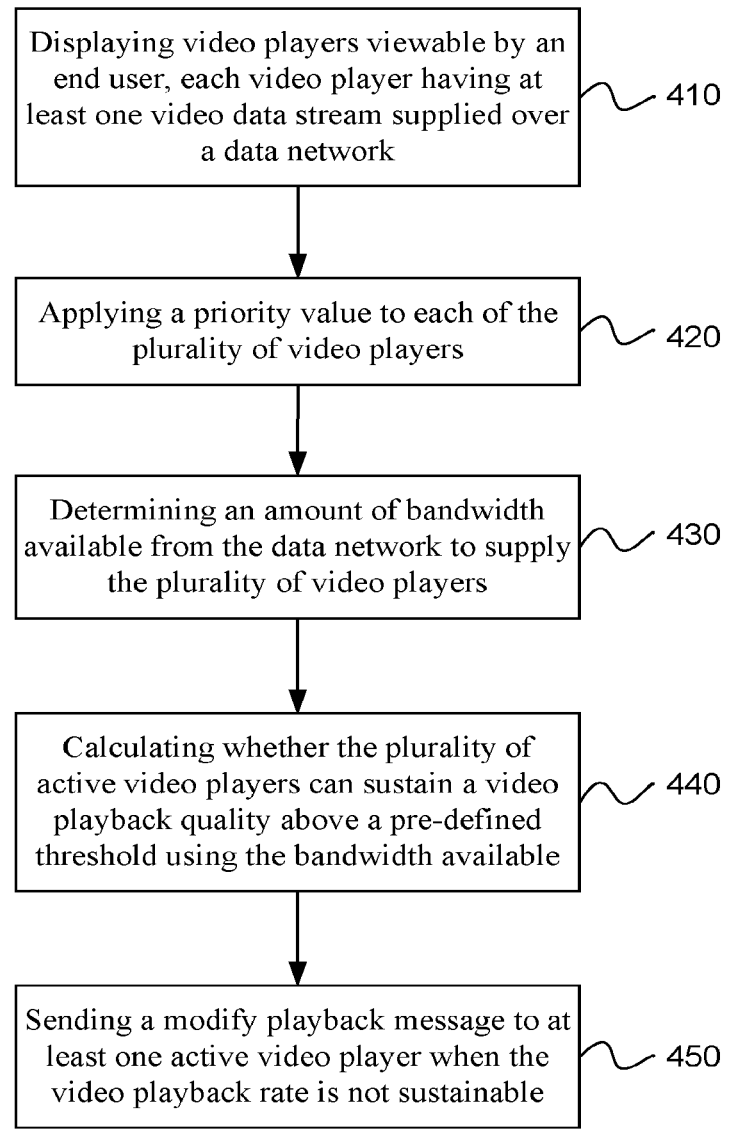
FIG. 4 is a flow chart depicting an embodiment of a method of managing multiple video players executing on a client software platform in a networked environment.

FIG. 4 illustrates an embodiment of a method of managing multiple video players executing on a client software platform in a networked environment. The method can include the operation of displaying a plurality of video players viewable by an end user, as in block 410. The video players can be contained within a web browser or another type of container application. Each video player can have at least one video data stream supplied over a data network.

A priority value can be applied to each of the video players, as in block 420. The priority value can be ordinal priority values. For example, if there are 5 video players then the video players' priority values may be ranked 1-5. However, a priority value does not need to be applied to all of the plurality of video players. Some video players may not have a priority and non-prioritized players will be able to play video streams and/or share any remaining amount of bandwidth that is not used by prioritized players. In contrast, prioritized players are intended to play continuously when the bandwidth is available.

An amount of bandwidth that is available from the data network to supply the plurality of video players can also be determined, as in block 430. The amount of bandwidth that is actually available to the video players is used to determine how much of that bandwidth can be distributed between the video players. More specifically, a calculation can be performed to determine whether the active video players can sustain a video playback quality above a pre-defined threshold using the determined amount of bandwidth available, as in block 440. When the video playback rate is not sustainable, then a modify playback message can be sent to at least one video player which is active, as in block 450.

The modify playback message can be a stop playback message that is sent to an active video player. The video player that is picked to receive the stop playback message can be a video player with a lower priority value than a main video player. In some situations, the lowest priority video player will be picked.

In one embodiment, the "modify playback message" can be received by the lowest priority player and the lowest priority player will reduce its bandwidth requests by switching to the next lowest priority profile selection. The selected player can then continue to decrease its bandwidth as the selected player receives additional modify playback messages until the selected player stops playing. Then the modify playback messages may be sent to the next highest priority player.

In an alternative embodiment, if the modify playback message is a request to reduce bandwidth, then the lowest priority video player that is using its preferred bandwidth selection will reduce its bandwidth requests. Then the next lowest priority video player can be picked and so forth. If every player has given up its top bandwidth profile selection, then the process can be repeated starting with the lowest priority player that is using its second highest bandwidth selection in the video player profile and having the video player give up its second highest bandwidth profile selection. This process will work through the video players with progressively higher priorities until all the video players have given up the second most desired bandwidth profile selection. This process can continue until the desired amount of bandwidth consumption is reached for aggregate group of video players.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A method executable by a computing system to manage two or more video players that are each executing in a networked environment, wherein each of the two or more video players is configured to present a video data stream made up of streamlets that are requested by the video player and that are supplied to the video player over a data network, the method comprising:

determining, by the computing system, an aggregate amount of bandwidth available from the data network to supply all of the video players executing in the networked environment;

calculating, by the computing system, whether the two or more video players can sustain a video playback quality above a pre-defined threshold using the determined aggregate amount of bandwidth available; and sending a modify playback message from the computing system to at least one of the two or more video players via the data network when the video playback quality is not sustainable to thereby instruct the at least one video player to request streamlets of the video data stream having a different quality level and to thereby automatically adjust a quality of the video data stream supplied over the data network to the at least one video player, thereby affecting the aggregate amount of bandwidth available from the data network to supply the two or more video players executing in the networked environment.

2. The method of claim 1, further comprising the computing system sending a second modify playback message via the data network to the at least one video player via the data network when the video playback quality is again sustainable to thereby instruct the at least one video player to automatically restore the quality of the video data stream by requesting streamlets of the video data stream having a higher quality.

3. The method of claim 1, wherein the step of sending the modify playback message further comprises the computing system sending a playback not sustainable message via the data network to an active video player having a lower priority value than a main video player when the video playback quality of the main video player is not sustainable.

4. The method of claim 1, wherein the step of sending a modify playback message further comprises the computing system sending a reduce playback quality message via the data network to a video player having a lower priority than a main video player and using a highest profile bandwidth when the video playback quality of the main video player is not sustainable.

5. The method of claim 4, wherein the step of sending a modify playback message further comprises the computing system sending a reduce playback quality message via the data network first to a lowest priority video player until the lowest priority video player is stopped and then to progressively higher priority video players.

6. The method of claim 1, further comprising the computing system applying an ordinal priority ranking to each of the two or more video players.

7. The method of claim 6, wherein the step of applying a priority ranking further comprises the step of applying a greedy flag to one or more of the two or more video players, wherein the greedy flag defines video players which will not reduce video playback below a minimum defined level.

8. The method of claim 1, further comprising the steps of:
determining an amount of processing power available on a client computer to process and display video for the plurality of video players;
calculating whether the selected video players can sustain a video playback quality above a pre-defined threshold using the determined amount of bandwidth and processing power available.

9. The method of claim 1, wherein the step of sending a modify playback message further comprises the step of sending a reduce playback quality message first to a lowest priority video player until the lowest priority video player is reduced to a minimum playback level as limited by a greedy flag and then to progressively higher priority video players which are limited by a greedy flag.

10. The method of claim 1, wherein the step of sending a modify playback message further comprises the step of sending a reduce playback quality message first to a lowest priority player which gives up a most desired profile selection and then to higher priority players up the priority chain which give up their most desired profile selection until a target bandwidth is reached.

11. A computing system configured to manage video playback on two or more video players each configured to be viewable by an end user, each video player having at least one video data stream supplied as streamlets requested by the video player and delivered over a data network, wherein the system comprises a processor that is configured to execute instructions comprising:
determining an aggregate amount of bandwidth available from the data network to supply all of the two or more video players;
calculating whether the two or more video players which are active can sustain a video playback quality above a pre-defined threshold using the determined aggregate amount of bandwidth available from the data network; and
sending a modify playback message from the computing system via the network to at least one of the two or more video players when the video playback quality is not sustainable to thereby instruct the at least one video player to request streamlets of the video data stream having a different quality level to thereby automatically adjust a quality of the video data stream supplied over the data network to the at least one video player, thereby affecting the aggregate amount of bandwidth available from the data network to supply all of the two or more video players executing in the networked environment.

12. A system as in claim 11, wherein the processor is further configured to define a plurality of data rate levels at which video transfer can take place for defined video data blocks.

13. A system as in claim 12, wherein the processor is further configured to send a stop playback message to an active video player which has a lowest priority value, the message being sent when the video playback quality is not sustainable.

14. A system as in claim 11, wherein the processor is further configured to send a reduce playback quality message to a video player having a lower priority than a main video player when the video playback quality is not sustainable, in order to reduce the playback quality being requested by the video player.

15. A system as in claim 11, wherein the processor is further configured to apply an ordinal priority ranking to each of the two or more video players.

16. A system as in claim 11, wherein the processor is further configured to apply a greedy flag to one or more video players, wherein the greedy flag defines video players which will not reduce video playback below a minimum defined level.

17. A system as in claim 11, wherein the plurality of video players comprises at least one non-priority video player that does not have an assigned priority value.

18. A method executable by a computer system to manage two or more video players executing in a networked environment, wherein each of the two or more video players receives a video data stream that is viewable by an end user and that is supplied as a series of streamlets that are each individually requested by the video player and delivered over a data network, the method comprising:
determining an aggregate amount of bandwidth available from the data network to supply all of the two or more video players;
calculating, by the computer system, whether the a prioritized one of the two or more video players can sustain a video playback quality above a pre-defined threshold using the determined aggregate amount of bandwidth available from the data network; and
the computer system sending a modify quality playback message via the data network to at least one of the two or more video players having a lower priority than the prioritized video player when the video playback quality is not sustainable to thereby instruct the video player having the lower priority to reduce a quality of the video data stream supplied to the video player having a lower priority by requesting streamlets of the video data stream having a lower quality level, thereby increasing the aggregate amount of bandwidth available from the data network available to supply the prioritized video player.

19. A method as in claim 18, wherein the step of sending a modify playback message to the at least one video player having a lower priority further comprises the step of identifying multiple ones of the two or more video players at the same lower priority.

20. A method as in claim 18, further comprising the computer system defining a video player profile for each of the two or more video players, the video player profile having a plurality of data rate levels that correspond to video streamlet sizes for video transfer and viewing at multiple bit rates.

* * * * *